April 2, 1963 S. T. SHEARS 3,083,430
METAL AND PLASTIC SOCKET
Filed Oct. 20, 1960
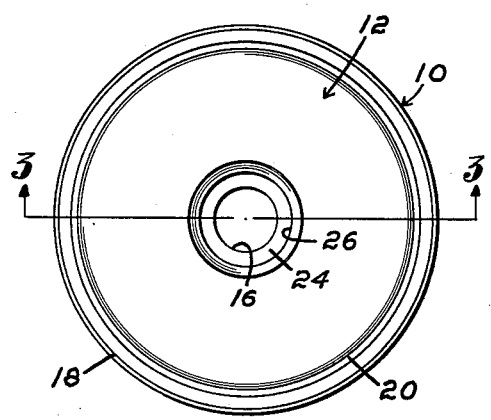
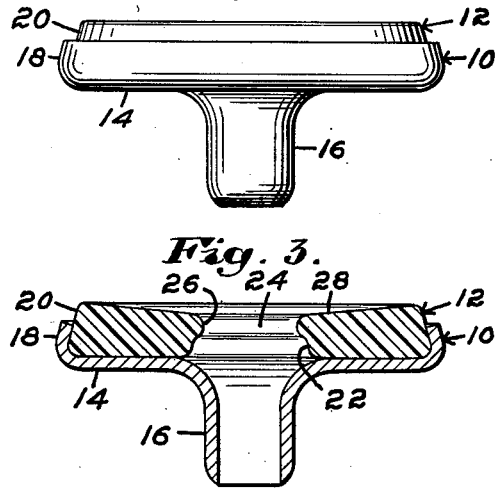
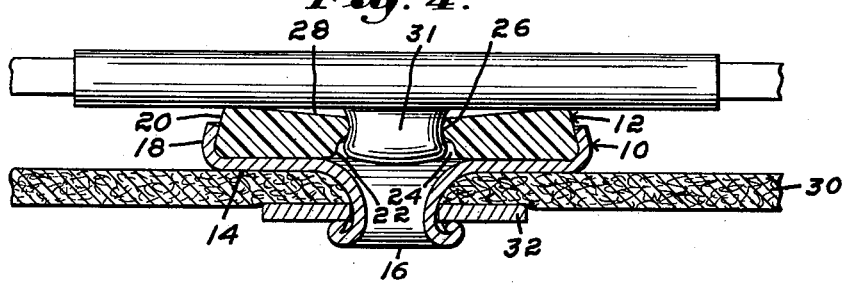
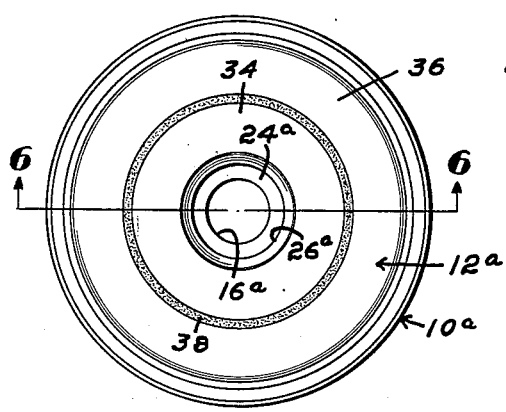
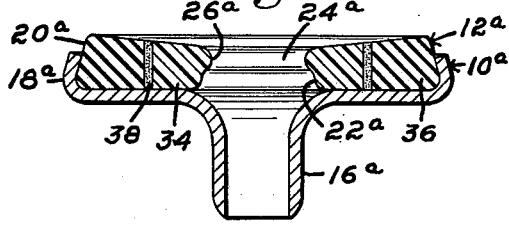
Inventor:
Stuart T. Shears,
by Walter S. Jones
Atty.

United States Patent Office 3,083,430
Patented Apr. 2, 1963

3,083,430
METAL AND PLASTIC SOCKET
Stuart T. Shears, Belmont, Mass., assignor to United-Carr Fastener Corporation, Cambridge, Mass., a corporation of Delaware
Filed Oct. 20, 1960, Ser. No. 63,895
1 Claim. (Cl. 24—216)

The present invention relates to fastener sockets and more specifically to separable fastener sockets.

An object of the invention is to provide a fastener socket having an outer supporting shell and an insert partially enclosed by the shell.

A further object of the invention is to provide a fastener socket having an outer supporting shell and an insert of different material than the shell partially enclosed by the shell.

A still further object of the invention is to provide an insert for a fastener socket having different materials joined together, each material designed for a different function.

Other objects of the invention will, in part, be obvious, and will, in part, appear hereinafter.

In the drawings:

FIG. 1 is a top plan view of the fastener socket;

FIG. 2 is a side elevation of the socket shown in FIG. 1;

FIG. 3 is a section taken on line 3—3 of FIG. 1;

FIG. 4 is a side elevation partly in section showing the socket engaged to a support and a stud;

FIG. 5 is a top plan view of a variation of the socket shown in FIG. 1; and

FIG. 6 is a cross section taken on line 6—6 of FIG. 6.

Referring to the drawings, particularly FIGS. 1 through 4, there is shown a fastener socket comprising a socket body 10 and an insert 12. The socket body 10 may be made of any fairly rigid material such as sheet metal or nylon. The socket body 10 comprises a base 14 whose central portion is drawn or formed into a tubular shank element 16. The base 14 may advantageously be formed in a circular configuration although a square or other configuration would also function satisfactorily. The peripheral edge of said base 14 extends at an angle to form a peripheral upstanding wall 18, the said wall 18 and the base 14 forming a cup shaped configuration. The insert 12 comprises generally a truncated cone having an annular outer surface 20 and an inner wall 22 defining a central aperture 24 open at both ends. The inner wall 22 is in substantially spaced parallel relationship with the annular outer surface 20. A bead 26 is formed adjacent one end of the tube formed by said inner wall 22 and the contact surface 28 of the insert 12 is dished from said annular outer surface 20 to the terminal edge of said bead 26 to provide a lead. The surface of said bead 26 is arcuate in form, although certain other angular configurations would also function satisfactorily.

The insert 12 is engaged with the socket body 10 by placing said insert 12 within the cup formed by said base 14 and said peripheral upstanding wall 18 in a manner which causes said peripheral wall 18 to be in circumscribed abutting relationship with a portion of said annular outer surface 20 and the lower surface of said insert 12 farthest from said upper surface 28 rests in abutting relation upon said base 14 at best shown in FIG. 3. The peripheral upstanding wall 18 is then bent around its full circumference to conform to the angle of the annular outer surface 20 of said insert 12 which securely holds the insert 12 to the socket body 10.

The total assembly can then be engaged to a support 30 by passing the shank element 16 between the walls of an aperture formed in the support and then curling the terminal end of said shank element 16 against the surface of said support 30 adjacent the wall as indicated in FIG. 4. The attachment between the support 30 and the shank element 16 may be improved by placing a washer 32 between the curled portion of said shank 16 and the support 30 as shown in FIG. 4. The material of said support 30 may be leather, cloth, plastic or for that matter, almost any material used in clothing or leather goods.

The engagement of the socket with a stud 31 is shown in FIG. 4. Since applicant's invention is concerned with socket construction, the type and kind of stud employed is of no great interest, except, of course, it must be of a type that will engage the socket for the purpose intended. The stud 31 indicated by the applicant at FIG. 4 has a bulbous head portion whose width is slightly greater than the diameter formed by said bead 26 and slightly less than the diameter formed by said inner wall 22. As the head of said stud 31 passes between the bead 26, the material of the insert compresses, allowing the head to pass, then the elastic memory of the material will place the bead 26 into abutting relationship with the neck of the stud.

A variation of the insert disclosed herein at FIGS. 5 and 6 may be made using different materials to perform different functions to obtain the type action required in the socket. The socket body 10a may be made the same as the socket body 10 and the physical shape of the insert 12a is the same as that of the insert 12. The material of the inner portion 34 of the insert 12a is made of a fairly rigid material capable of standing up under frictional wear, such as nylon or Tenite II. Therefore, the bead 26a and the inner wall 22a will be made of this rigid material. The outer portion 36 of the insert 12a is made of some easily compressible material such as rubber and certain plastics. Said outer portion 36 would include as one of its portions the annular outer surface 20a corresponding to said annular outer wall surface 20. Obviously the bulk of compression in the variation will take place in the outer portion 36. The outer portion 36 and the inner portion 34 are bonded together by a bonding material 38, such as the epoxies, as shown in FIG. 6 to form the complete insert 12a. This type of insert may be important in certain instances for better control of the snap action of the fastener.

If necessary, particularly where the material of the insert 12 is very hard, the bead 26 and the inner wall 22 may be split laterally to allow an expansion similar to that obtained in many types of socket members. This particular variation is not shown in the drawings.

Since certain other obvious modifications may be made in this device without departing from the scope of the invention, it is intended that all matter contained herein be interpreted in an illustrative and not in a limiting sense.

I claim:

A fastener socket for receiving a stud comprising a socket body and an insert, said socket body having a base and a peripheral upstanding wall, said base having an integral tubular shank element, said inert including a resilient portion and a relatively rigid portion, said resilient portion bonded to said relatively rigid portion, said resilient portion circumscribed in abutting relation by said peripheral upstanding wall, and said relatively rigid portion having an inner wall defining an aperture.

References Cited in the file of this patent

UNITED STATES PATENTS

| | | |
|---|---|---|
| 2,548,004 | Duefrene | Apr. 10, 1951 |
| 2,851,756 | Jones | Sept. 16, 1958 |

FOREIGN PATENTS

| | | |
|---|---|---|
| 228,368 | France | of 1893 |
| 360,591 | France | Mar. 2, 1906 |
| 874,586 | Germany | Apr. 23, 1953 |
| 436 | Great Britain | of 1878 |
| 777,870 | Great Britain | June 26, 1957 |